United States Patent
Jennings et al.

(10) Patent No.: US 6,587,897 B1
(45) Date of Patent: Jul. 1, 2003

(54) METHOD FOR ENHANCED I/O IN AN EMULATED COMPUTING ENVIRONMENT

(75) Inventors: Andrew T. Jennings, West Chester, PA (US); G. Lawrence Krablin, Downingtown, PA (US); Timothy Neilson Fender, Berwyn, PA (US); William Stratton, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 532 days.

(21) Appl. No.: 09/595,653

(22) Filed: Jun. 16, 2000

(51) Int. Cl.[7] .............................................. G06F 13/28
(52) U.S. Cl. ............................ 710/24; 710/5; 710/20; 711/111; 711/137
(58) Field of Search .......................... 710/5, 13, 20, 710/24, 36, 65, 107, 52, 7, 12; 711/100, 111, 115, 137; 712/300, 225

(56) References Cited

U.S. PATENT DOCUMENTS

| | | | | |
|---|---|---|---|---|
| 5,088,033 A | | 2/1992 | Binkley et al. | 395/500 |
| 5,265,237 A | * | 11/1993 | Tobias et al. | 395/500 |
| 5,627,975 A | * | 5/1997 | Bryant et al. | 710/127 |
| 5,781,749 A | | 7/1998 | Le Quere | 395/309 |
| 5,819,117 A | * | 10/1998 | Hansen | 712/300 |
| 5,890,015 A | * | 3/1999 | Carney et al. | 710/62 |
| 5,898,896 A | * | 4/1999 | Kaiser et al. | 710/65 |
| 6,021,275 A | * | 2/2000 | Horwat | 395/707 |
| 6,032,212 A | * | 2/2000 | Goode et al. | 710/129 |

\* cited by examiner

*Primary Examiner*—Jeffrey Gaffin
*Assistant Examiner*—Rijue Mai
(74) *Attorney, Agent, or Firm*—Woodcock Washburn MacKiewicz & Norris; Michael B. Atlass; Mark T. Starr

(57) ABSTRACT

An emulation system functions to translate instructions comprising a target application of a target system into corresponding instructions native to a host system and executes the instructions on the host system. During execution, the emulation system encounters target disk read/write operations. As the memory architectures of the host and target computer systems differ, the data in host memory is conformed to a target memory format when data in keyboard memory buffer is processed. Also, the host and target disk controllers cause storage of data on diskettes in differing byte orders. However, the emulation system performs disk/read write operations without byte-reversal prior to disk-write or subsequent to disk read operations. Thus, the host does not produce storage media having data conforming to that of target storage media. However, despite this drawback, the emulation system strikes a favorable balance between the need for precise replication of target application functionality on the one hand, and the importance of overall emulation system performance on the other.

28 Claims, 6 Drawing Sheets

Disk Read

Disk Read

FIGURE 5

| Mem Addr | 0x0 | 0x1 | 0x2 | 0x3 | 0x4 | 0x5 | 0x6 | 0x7 |
|---|---|---|---|---|---|---|---|---|
| LE | H | G | F | E | D | C | B | A |
| BE | A | B | C | D | E | F | G | H |

DISK WRITE

DISK READ

DISK WRITE

METHOD FOR ENHANCED I/O IN AN EMULATED COMPUTING ENVIRONMENT

FIELD OF THE INVENTION

The present invention generally relates to the field of emulation or simulation. More particularly, the present invention relates to a method for performing more efficient input from, and output to, storage media in an emulated computing environment.

BACKGROUND OF THE INVENTION

The idea of emulating an existing software execution environment on a hardware architecture other than the one it was designed for is not new. At the same time, the need for more efficient, elegant solutions to the problems typically arising in the area of emulation has never been greater. For example, the information technology departments of numerous critical industries (e.g., banking, insurance, airline) often work in enterprise server platform (e.g., mainframe) environments which typically feature proprietary technology. In many instances, these departments have developed and enhanced critical applications using such proprietary platforms over decades.

Concurrently, recent developments have revealed a trend toward industry-wide standardization of components associated with open platform type processing environments. Such open platforms typically deliver flexibility, more friendly user interfaces and generally run in a hardware environment consisting of largely commodity components. Thus, open platform systems tend to be less expensive than proprietary enterprise server platforms. Accordingly, the need for emulation of proprietary enterprise server based applications and software in a more widely used, commodity hardware architecture is burgeoning.

"Emulation" generally refers to the process of simulating the functionality and output of a target system application in a host system environment having an architecture which differs from that of the target system. To achieve such "emulation," a translator/interpreter program(s) executable by the host system is provided which maps the instructions comprising the target system application (i.e., the application emulated) into a corresponding instruction set native to the host system.

The task of developing such a translator/interpreter is not straightforward. In particular, the instruction set native to the target system necessarily represents a set of commands resulting in processes which are architecture specific. For example, the direction in which the bytes of a machine word are stored in memory may vary from architecture to architecture. "Big Endian" architectures cause data words to be written to memory starting with the most significant byte and ending with the least significant byte. By contrast, "Little Endian" architectures cause data words to be written to memory in the opposite order (i.e., from least significant byte to most significant byte). Thus, if the memory architecture of the host system stores data words in a manner opposite to that of target system memory, then the execution of native host byte stream operations (e.g., processing keyboard buffer byte streams) may not, by itself, properly emulate the byte stream operations of a corresponding target application.

The most natural solution to this problem, which has been implemented in a variety of prior emulation environments, is to perform byte-reversal techniques on byte streams of data prior to processing such streams. Byte reversal techniques are well known in the art. See, e.g., U.S. Pat. No. 5,970,236. By reversing the order of bytes prior to processing byte streams, the format of data used by applications run on a host are made to mimic that of data expected by target applications.

The emulation of target I/O (i.e., disk, peripheral storage medium) often involves complications similar to those described above. For example, emulation of the target environment may typically involve emulation of the target disk controller including its output to, and input from, storage media. However, as with memory architectures, it is not unusual for the target disk controllers to write data bytes in one order, while the native host controller writes data in another, opposite byte order. In that event, to strictly emulate the write-to-disk operation of the target controller, the emulator system must again "byte reverse" data prior to disk write operations to mimic the format of disk data produced in the target environment.

Unfortunately, such byte-reversal techniques are computationally expensive and time consuming. When used in conjunction with fundamental, frequently encountered operations such as disk read and write, processing is slowed significantly as a result.

A natural solution to this problem lies in enhancing the efficiency of existing byte-reversal techniques. Byte reversal hardware implementations, providing significantly faster processing time relative to software implementations, do already exist in the art. See U.S. Pat. No. 5,970,236. Nevertheless, even such hardware implementations of byte reversing significantly slow processing if performed repeatedly. Accordingly, there is a need for more efficient peripheral, I/O operation in emulation computing environments.

SUMMARY OF THE INVENTION

The present invention is based on the observation that strict emulation of each target component on the host does not always result in an optimal emulation package. More specifically, the present invention addresses the need for more efficient I/O in emulation computing environments by providing an emulator which executes the applications of a target system on a host system, without completely emulating operation of the target peripheral, storage media controller. For example, it might be the case that the target storage media controller reads/writes data bytes to a storage medium in one order, while the native host controller reads/writes data in another order. In accordance with one embodiment of the present invention, the emulation system bypasses byte-reversal conversion prior to storage media-write operations and, accordingly, does not produce storage media having data conforming to that of target storage media.

Despite this drawback, the emulation system strikes a favorable balance between the need for precise replication of target application functionality on the one hand, and the importance of overall emulation system performance on the other. In particular, a target application project running in an emulation environment will rarely involve further use of the target system or use of storage media in the target. In fact, users who purchase emulation packages generally do so precisely to switch away from a target hardware and platform environment while maintaining the viability of existing target applications. Moreover, because storage media controllers generally read data in the same order it is written, regardless of what that order is, data in emulation system memory remains unimpaired regardless of the order of host controller read/write operations.

Accordingly, one advantage of the present invention is that it improves the efficiency and speed of I/O operations in emulation computing environments.

Another advantage of the present invention is that it simplifies the development of emulation programs where the target storage media controller writes data to storage media in a manner different than that of a host storage media controller.

Further advantages of the present invention will become apparent from the more detailed description below.

BRIEF DESCRIPTION OF THE DRAWINGS

FIG. 5 depicts how the storage of data bytes in memory in "Big Endian" architecture computing environments contrasts with the storage of data bytes in memory in "Little Endian" architecture computing environments.

FIG. 6b visually depicts and contrasts the effects of respective read-from-disk operations of the target and host storage media controllers illustrated in FIG. 6a.

FIG. 6c illustrates the effect of performing a byte-swapping technique immediately prior to the host controller write-to-disk operation illustrated in FIG. 6a.

DETAILED DESCRIPTION OF PREFERRED EMBODIMENTS

Figure 1:
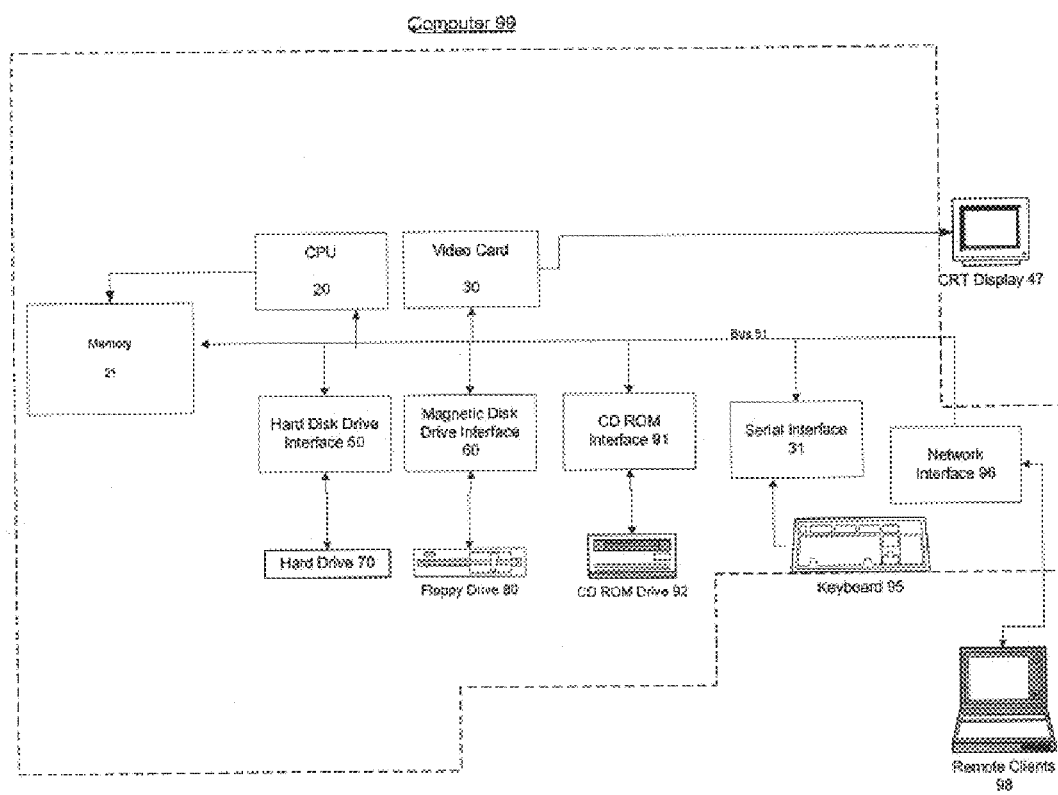
FIG. 1 is a block diagram illustrating hardware and software components of a conventional computing environment in which an emulation process in accordance with the present invention may be implemented.

FIG. 1 is a block diagram illustrating hardware and software components of a conventional computing environment in which an emulation process in accordance with the present invention may be implemented. A computer 99, which may also function as a network server, includes conventional computer hardware components including a Central Processing Unit ("CPU") 20, a system memory 21, and a system bus 51 that couples the system memory 21 to CPU 20 and other computer system 99 components. The system memory 21 typically includes read only memory (ROM), random access memory (RAM) or other conventional known memory types. Instructions comprising application program modules are typically stored in and retrieved from memory 21 by CPU 20, which executes said instructions.

A user may enter commands and other input into the computer 99 via input devices such as a keyboard 95, mouse, scanner or other input device. In exemplary computer system illustrated, the keyboard 95 is coupled to CPU 20 via a serial port 31 coupled to system bus 51.

A display device 47 is also coupled to the system bus 51 via a video graphics adaptor card 30. The display device 47, which may be a CRT monitor, LCD terminal or other display, includes a screen for the display of information which is visible to the user.

As noted earlier, the computer 99 may also function as a server connected in a LAN, WAN or other networked environment. The computer 99 is thus connected to other remote computers 98 (e,g., personal computers, routers, servers, clients) via a local area network interface 96, modem or other communications device.

Figure 2:
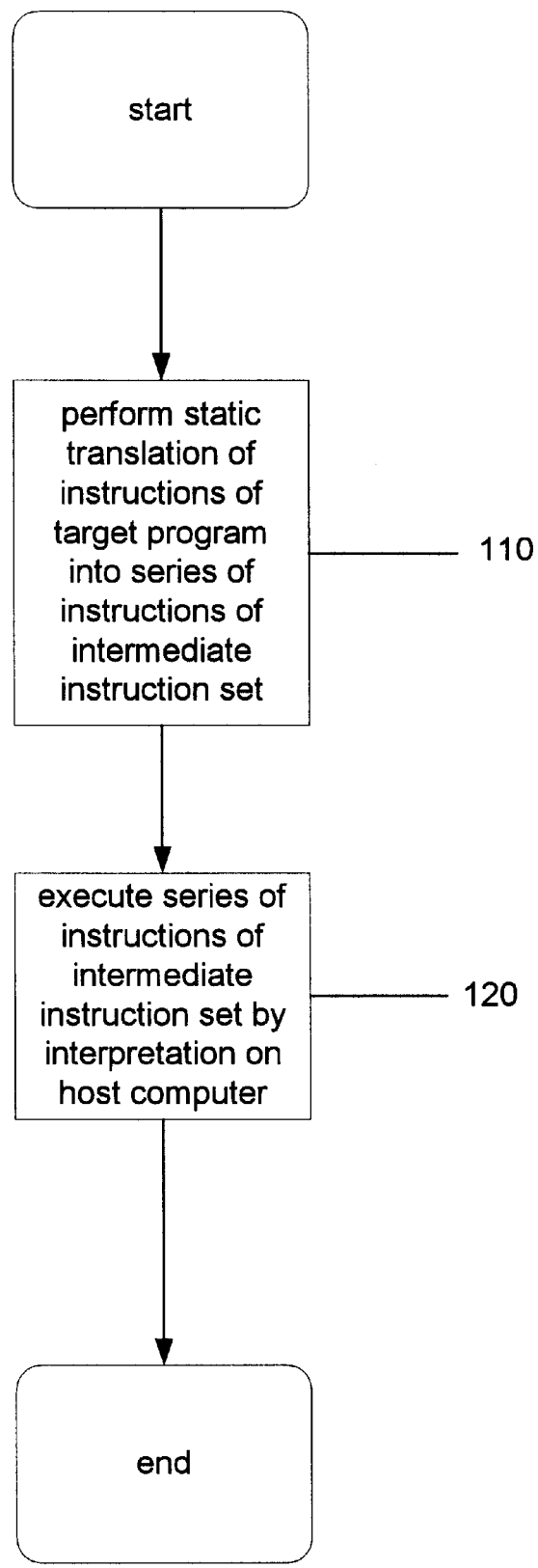
FIG. 2 is a high-level flow chart illustrating an exemplary overview of an emulation process, which may incorporate enhanced peripheral, storage media I/O in accordance with the present invention.

FIG. 2 shows a high-level flow chart illustrating an exemplary overview of an emulation process, which may incorporate enhanced peripheral, storage media I/O in accordance with the present invention. As noted earlier, the emulation process generally consists in translating/interpreting the instructions comprising the target system application (i.e., the application emulated) into a corresponding instruction set native to the host system. Various approaches to developing emulators are known in the art. For example, certain emulation systems translate the entire instruction set of a target application into a corresponding native host instruction set prior to execution of the application. Other prior art emulation systems follow a purely interpretive model (i.e., each line of target instructions is translated to native instructions and executed prior to processing of the next line).

In a preferred embodiment of the present invention, illustrated in FIG. 2, the overall emulation process consists of (a) translating the entire instruction set comprising the target application into an intermediate instruction set, optimized for high speed interpretation on the host; and (b) executing the intermediate instruction set by interpretation (i.e., by translating and executing each line of the intermediate instruction set on the host). Thus, in Step 110, a translation of a target instruction set is performed resulting in an intermediate instruction set. In Step 120, the intermediate instruction set is executed by interpretation on the host. An emulation system implementing these steps strikes a favorable balance by improving on the execution speed of purely interpretive emulation systems while avoiding the complexities of emulation systems which translate target instructions directly to a native host instruction set.

During the execution phase, the host CPU 20 always encounters and executes certain fundamental, frequently used operations typically included in target applications, such as keyboard buffer data reads, disk-read, disk-write, etc. Because such operations are both common and critical to most applications, the efficiency achieved in executing these commands is crucial to the overall performance of the emulation system.

For example, emulation of a target will often involve reading streams of data from a keyboard memory buffer when the user uses the keyboard 95. However as noted above, such byte streams processing operations often involve additional processing when executed in a corresponding manner on the host. In particular, as the target and host memory architectures may differ, the proper emulation of such byte stream processing operations may require the use of byte-reversal techniques on the host to mimic the data format expected by the emulated target application.

For example, FIG. 5 illustrates how the storage of data bytes ion memory in "Big Endian" architecture computing environments contrasts with the storage of data bytes in memory in "Little Endian" architecture computing environments. In general, memory devices are organized as cells capable of holding data, each associated with a corresponding memory address. When prompted with a write-to-memory or read-from-memory command, a system 99 CPU 20 will cause a machine word to be, respectively, written to or read from memory starting from a lowest (current) address offset,"0×0," to a highest address offset, "0×7." For illustrative purposes, the machine word is assumed to be eight bytes long (e.g., bytes A–G), but computing architectures may be characterized by machine words which are longer or shorter in length.

As further illustrated in FIG. 5, in memory architectures characterized by "Little Endian" data storage, machine words are stored from least significant byte to most significant byte. That is, the least significant byte of a machine word is stored at the lowest address offset. By contrast, in memory architectures characterized by "Big Endian" data storage, machine words are stored from most significant byte to least significant byte. That is, the most significant byte of a machine word is stored at the lowest address offset. Thus, if the memory architecture of the host system stores data words in memory in little endian format, and the target system stores data in memory in big endian format, or vice versa, then the straightforward execution of native host memory read/write operations may not, by itself, properly emulate a target application comprised of such read/write operations. For example, those instructions of a target application causing a byte stream in memory to be processed (e.g., the detection and processing of keyboard data streams upon user input) cannot be emulated by a corresponding native, host instruction. That is, either byte reversal techniques are used, or incorrect byte data is processed. Again, this problem is most naturally remedied using byte reversal techniques on the host emulator system, although processing efficiency suffers as a result.

The emulation of I/O operations is another area in which byte reversal techniques present a natural solution to the problems often presented. Specifically, the emulation of target applications usually involves emulating the movement of data in and out of secondary storage (i.e., optical diskettes, CD ROM's or other storage media). As with memory architectures, it is not unusual for the target disk controller to write data bytes in one order, while the native host controller writes data in another, opposite byte order. Thus, the target system disk controller might write data words to disk starting with the most significant byte of the word and ending the least significant byte, while the host system controller might write data in the opposite order, or vice versa. Again, in that event, the straightforward execution of native host disk read/write operations may not, by itself, properly emulate a target application comprised of such read/write operations. For example, a target command causing a controller to write a machine word to disk might be emulated by translating the command to a native instruction line and executing the instruction using the same machine word. However, the resulting disk data will not emulate disk data produced on the target system, because of the respective differences between host and target controller operation.

Again, the natural solution to this problem is to incorporate byte reversal techniques into the emulation process. In this way, data on host storage media are made to conform to data on the target storage media.

Figure 6A:
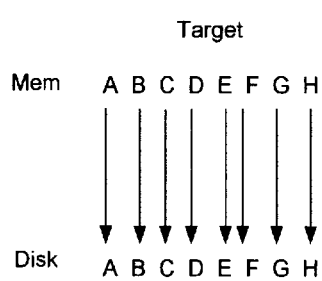
FIG. 6a visually depicts and contrasts the effects of respective write-to-disk operations of a target storage media controller, which writes data bytes to a storage medium in one order, and a native host controller writing data in another order.
Figure 6A:
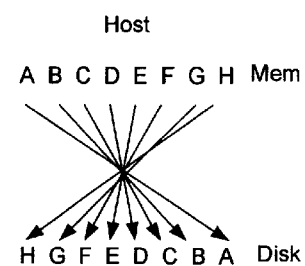
Figure 6B:
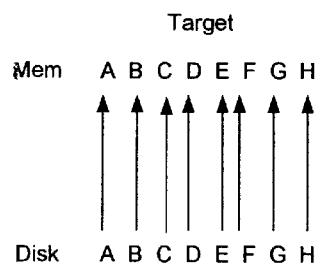
Figure 6B:
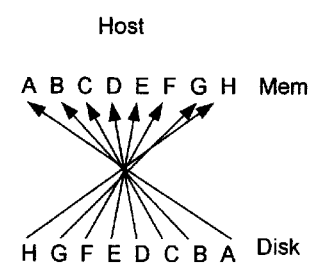
Figure 6C:
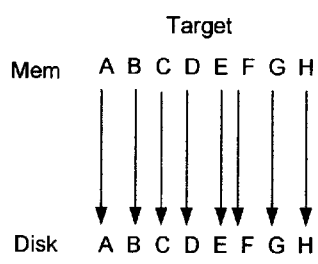
Figure 6C:
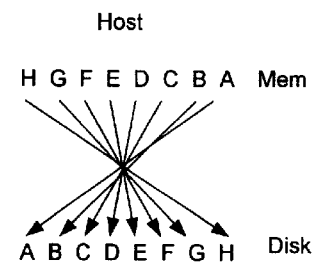

For example, FIG. 6c illustrates the effect of performing a byte-reversal technique immediately prior to a host controller write-to-disk operation of an eight-byte machine word. As depicted in FIG. 6c, target disk controller operates to write the eight-byte machine word (i.e., comprising bytes A–G) from memory to a disk starting from the most significant byte and ending with the least significant byte. By contrast, in the example depicted, the native host controller operates to write an eight-byte machine word from memory to disk starting from the least significant byte and ending with the most significant byte. Thus data produced on host storage media will be incompatible with the target system unless the emulation system performs a byte reversal operation in memory immediately prior to commencing the write to disk operation. When such byte-reversal is incorporated into the I/O operation, the emulation system will produce storage media that conform with target system storage media as depicted in FIG. 6c.

However, again, this byte-reversal solution negatively impacts the overall performance of the emulation process. In particular, the emulation system must perform byte-reversal for each disk-write operation. Moreover, because storage media controllers read data in the same order in which it is written, data will be retrieved from the disk in its post-byte reversed format (i.e., H-G-F-E-D-C-B-A in FIG. 6c). Thus, yet another byte reversal operation is required in order transfer data from disk and back to memory in its original, conformed format. Thus, to strictly mimic the target system I/O, the emulation system must perform byte reversal before each write-to-disk operation and after each read from-disk-operation, thus significantly slowing emulation processing.

Figure 3:
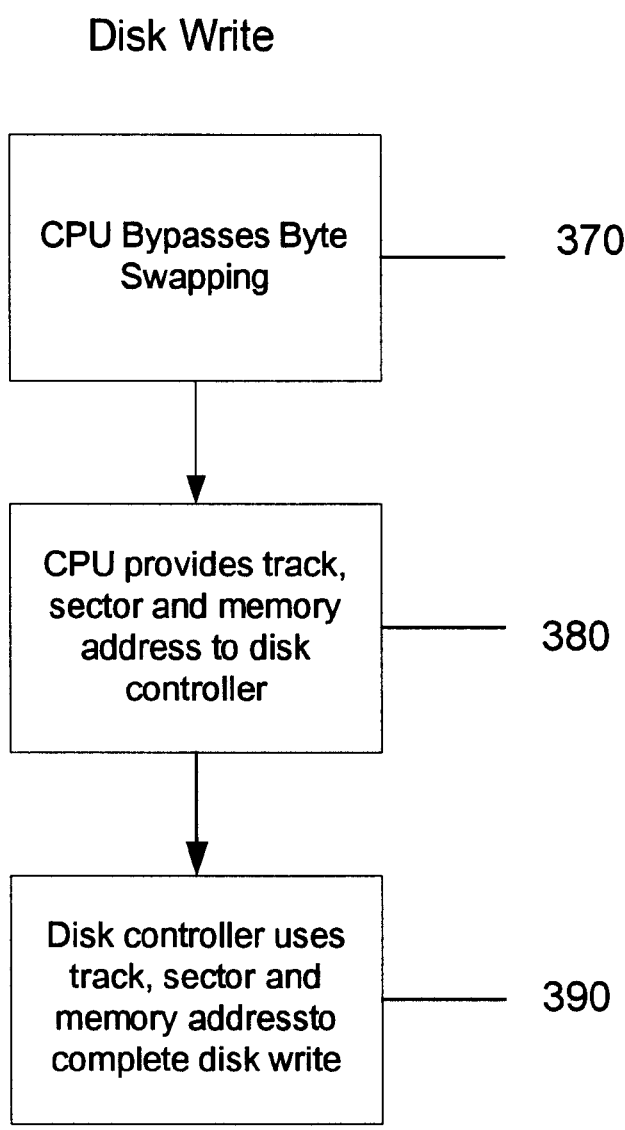
FIG. 3 is a flow chart illustrating, in accordance with one embodiment of the present invention, typical disk write operations performed during the interpretation/execution of the emulation process depicted in FIG. 2.

Accordingly, turning to FIG. 3, in accordance with one embodiment of the present invention, the CPU 20 on the host system bypasses byte reversal immediately prior to the write to disk operation in Step 370. In Step 380, in convention fashion the, CPU 20 provides to the host controller the track, sector and memory address of a word to be written to disk. Finally, in Step 380, the host controller completes the write to disk operation by using the information provided to cause the specified machine word to be written to the specified track and sector of the disk.

FIG. 6a illustrates the disk data produced by an emulation system which bypasses byte-reversal in accordance with Step 370. Once again, as in FIG. 6c, the illustrated target disk controller operates to write the eight-byte machine word to disk starting from the most significant byte and ending with the least significant byte, while the host controller stores data in the opposite direction. As illustrated in FIG. 6c, the emulation system does not produce storage media having data conforming to that of target storage media.

Despite this drawback, by bypassing byte-reversal operations, the emulation system strikes a favorable balance between the need for precise replication of target application functionality on the one hand, and the importance of overall performance on the other. In particular, because storage media controllers generally read data in the same order it is written, data in emulation system memory is unaffected by format transformations performed by controller read/write operations.

Figure 4:
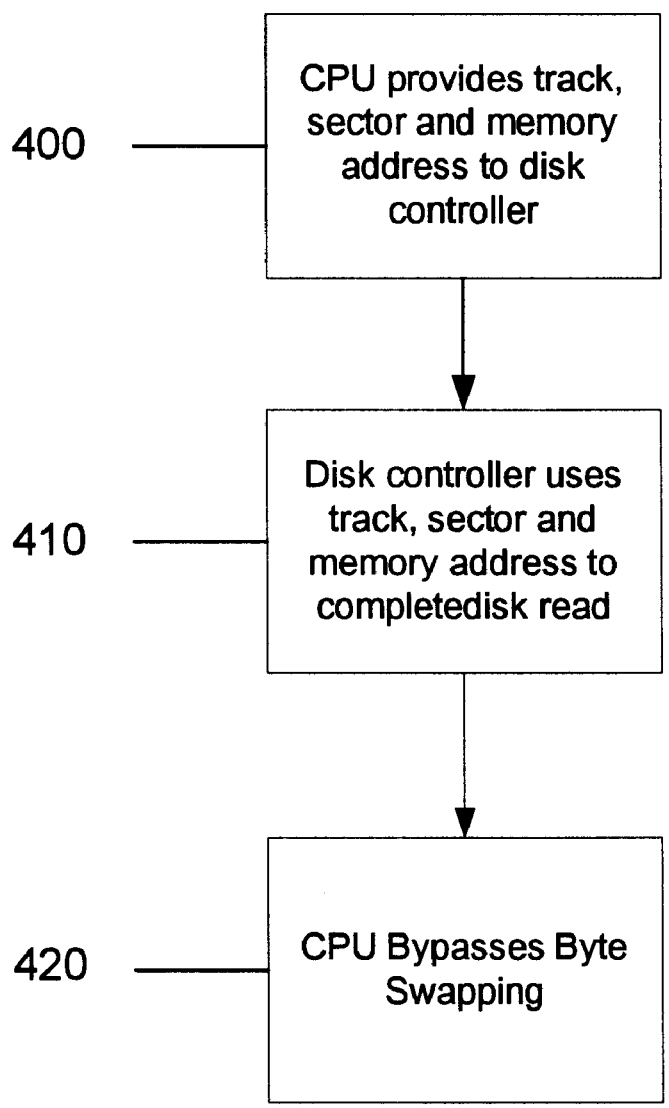
FIG. 4 is also a flow chart illustrating, in accordance with one embodiment of the present invention, typical disk read operations performed during the interpretation/execution of the emulation process depicted in FIG. 2.

To illustrate, FIG. 4 depicts a continuation of the emulation process shown in FIG. 3, and in particular, depicts a disk-read operation which functions to read back into host memory the machine word written to disk in Steps 370–390. In Step 400, in conventional fashion the, CPU 20 provides to the host controller the track, sector of data to be retrieved, as well as the memory location to which the data will be transferred. Next, in Step 410, the host controller completes the read-from-disk operation by using the information provided to cause the specified machine word to be read from the specified track and sector of the disk and transferred to the specified memory address. As illustrated in FIG. 6b, the data read by host disk controller in Step 410 is transferred to memory in the same order it was original written to disk. That is, in the example depicted, the host controller writes data to, and reads data from, disk in the same order (i.e., as depicted in FIGS. 6a and 6b, from left to right). As a result, after the host controller transfer from disk in Step 410, the machine word transferred assumes the same format in memory (depicted in FIGS. 6a and 6b as "A-B-C-D-E-F-G-H") that characterized the machine word prior to disk write. Furthermore, because the machine word had, prior to disk write, already been conformed to the byte ordering format of the target system memory, the machine word is in proper format in memory for further emulation processing without further byte-reversal. As illustrated in FIG. 6b, target and host controller disk-read operations cause a transfer to memory of machine words having the same format (i.e., "Endianess"). Thus, in Step 420 of FIG. 4, in accordance an embodiment of the present invention, the CPU 20 on the host system bypasses byte reversing immediately subsequent to the read-from-disk operation.

CONCLUSION

While certain aspects of the present invention are described with particularity above, persons skilled in the art will recognize that various modifications could be made to the examples provided without departing from the scope of the invention, which is defined by the claims below. For example, in the exemplary emulation system described, emulation of target disk controller I/O operations is bypassed. However, the emulation of other peripheral controllers (e.g., CD ROM controllers, tape controllers) can also be bypassed so long as data in emulation system memory is unaffected by format transformations performed during controller read/write operations. Furthermore, in the examples described, the target disk controller wrote/read data from most significant byte to least significant byte, while the host disk controller wrote/read data from least significant byte to most significant byte. However, it is clear that a similar problem arises (also resolved by the present invention) when the converse is true (i.e., the target disk controller writes data from the least significant byte to the most significant byte, while the host controller writes data from the most significant byte to the least significant byte).

Thus an emulation system has been presented which strikes a favorable balance between the need for precise replication of target application functionality on the one hand, and the importance of overall emulation efficiency and performance on the other. As a result, the efficiency and speed of I/O operations in emulation computing environments is improved.

What is claimed is:

1. A method for emulating on a host computer system architecture Input/Output operations designed to execute on a target computer system architecture, the target system architecture including a target controller for storing data to and reading data from a storage medium in a first byte ordering, the host system architecture including a host controller for storing data to and reading data from a storage medium in a second byte ordering, the first byte ordering differing from the second byte ordering, the method comprising:

a. converting instructions comprising an Input/Output operation designed to execute on the target computer system into corresponding instructions native to the host computer system, the corresponding instructions native to the host system including instructions for causing a data word in host memory to be written to a storage medium using the host controller; and b. without performing a byte-reversal, of the data word in host memory, executing the instructions for causing the data word in host memory to be written to the storage medium using the host controller.

2. The method of claim 1 for emulating on a host computer system architecture Input/Output operations designed to execute on a target computer system architecture wherein the step of converting instructions comprising an Input/Output operation is partially performed in a static translation phase and partially performed in an interpretation phase.

3. The method of claim 1 for emulating on a host computer system architecture Input/Output operations designed to execute on a target computer system architecture wherein the step of converting instructions comprising an Input/Output operation is entirely performed in a static translation phase.

4. The method of claim 1 for emulating on a host computer system architecture Input/Output operations designed to execute on a target computer system architecture wherein the step of converting instructions comprising an Input/Output operation is entirely performed in an interpretation phase.

5. The method of claim 1 for emulating on a host computer system architecture Input/Output operations designed to execute on a target computer system architecture wherein the storage medium is a diskette.

6. The method of claim 5 for emulating on a host computer system architecture Input/Output operations designed to execute on a target computer system architecture wherein the diskette is a floppy diskette.

7. The method of claim 1 for emulating on a host computer system architecture Input/Output operations designed to execute on a target computer system architecture wherein the storage medium is a CD ROM drive.

8. A method for emulating on a host computer system architecture Input/Output operations designed to execute on a target computer system architecture, the target system architecture including a target controller for storing data to and reading data from a storage medium in a first byte ordering, the host system architecture including a host controller for storing data to and reading data from a storage medium in a second byte ordering, the first byte ordering differing from the second byte ordering, the method comprising:

a. converting instructions comprising an Input/Output operation designed to execute on the target computer system into corresponding instructions native to the host computer system, the corresponding instructions native to the host system including instructions for causing a data word to be read from a storage medium into host memory using the host controller; and b. executing the instructions for causing the data word to read from the storage medium into host memory using the host controller; and c. bypassing a byte-reversal of the data word read into host memory.

9. The method of claim 8 for emulating on a host computer system architecture Input/Output operations designed to execute on a target computer system architecture wherein the step of converting instructions comprising an Input/Output operation is partially performed in a static translation phase and partially performed in an interpretation phase.

10. The method of claim 8 for emulating on a host computer system architecture Input/Output operations designed to execute on a target computer system architecture wherein the step of converting instructions comprising an Input/Output operation is entirely performed in a static translation phase.

11. The method of claim 8 for emulating on a host computer system architecture Input/Output operations designed to execute on a target computer system architecture wherein the step of converting instructions comprising an Input/Output operation is entirely performed in an interpretation phase.

12. The method of claim 8 for emulating on a host computer system architecture Input/Output operations designed to execute on a target computer system architecture wherein the storage medium is a diskette.

13. The method of claim 12 for emulating on a host computer system architecture Input/Output operations designed to execute on a target computer system architecture wherein the diskette is a floppy diskette.

14. The method of claim 8 for emulating on a host computer system architecture Input/Output operations designed to execute on a target computer system architecture wherein the storage medium is a CD ROM drive.

15. A method for emulating on a host computer system architecture a software application designed to execute on a target computer system architecture, the software application comprising instructions including the step of writing a data word to a target storage medium in a first byte ordering format using a target controller, the host system architecture including a host controller for writing data to host storage medium in a second byte ordering format, the first byte ordering format differing from the second byte ordering format, the method comprising:

a. converting instructions comprising the software application into instructions native to the host computer system;

b. performing an emulation of the step of writing the data word to the target storage medium in the first byte ordering format using the target controller, said emulation including executing at least a portion of the converted instructions native to the host computer system and writing the data word to the host storage medium in the second byte ordering format using the host controller; and c. executing any of the converted instructions native to the host computer system remaining.

16. The method of claim 15 for emulating on a host computer system architecture a software application designed to execute on a target computer system architecture wherein the step of converting instructions comprising the software application is partially performed in a static translation phase and partially performed in an interpretation phase.

17. The method of claim 15 emulating on a host computer system architecture a software application designed to execute on a target computer system architecture wherein the step of converting instructions comprising the software application is entirely performed in a static translation phase.

18. The method of claim 15 emulating on a host computer system architecture a software application designed to execute on a target computer system architecture wherein the step of converting instructions comprising the software application is entirely performed in an interpretation phase.

19. The method of claim 15 emulating on a host computer system architecture a software application designed to execute on a target computer system architecture wherein the host storage medium is a diskette.

20. The method of claim 19 for emulating on a host computer system architecture a software application designed to execute on a target computer system architecture wherein the diskette is a floppy diskette.

21. The method of claim 15 for emulating on a host computer system architecture a software application designed to execute on a target computer system architecture wherein the host storage medium is a CD ROM.

22. An emulation system for simulating a target software application on a host computer system, the target software application including a write-to-storage medium operation comprising writing a data word to target storage medium in a first byte ordering format using a target storage device with a target controller, the emulation system comprising:

a. a host processor with associated memory coupled to a host storage device with a host controller;

b. an conversion element comprising instructions residing in the host processor memory and capable of being executed by the host processor, said conversion element causing, together with said processor, conversion of instructions comprising the target software application into instructions native to the host processor and memory; and c. a simulation element comprising instructions residing in the host processor memory and capable of being executed by the host processor, said simulation element, together with said processor, simulating operations effected by the target software application by, at least, executing the converted instructions native to the host processor and memory, said simulation element simulating the write-to-storage medium operation of the target software application by writing the data word to the host storage medium in a second byte ordering format using the host storage device and host controller, the second byte ordering format differing from the first byte ordering format.

23. The emulation system of claim 22 for simulating a target software application on a host computer system wherein the conversion element resides in static translator and in an interpreter.

24. The emulation system of claim 22 for simulating a target software application on a host computer system wherein the conversion element resides entirely in a static translator.

25. The emulation system of claim 22 for simulating a target software application on a host computer system wherein the conversion element resides entirely in an interpreter.

26. The emulation system of claim 22 for simulating a target software application on a host computer system wherein the host storage device is a disk drive.

27. The emulation system of claim 26 for simulating a target software application on a host computer system wherein the disk drive is a floppy disk drive.

28. The emulation system of claim 22 for simulating a target software application on a host computer system wherein the host storage device is a CD ROM drive.

* * * * *